US005423113A

United States Patent [19]

Jezowski

[11] Patent Number: 5,423,113

[45] Date of Patent: Jun. 13, 1995

[54] AIR BRAKE ANCHOR SPRING PLIERS

[76] Inventor: Frank Jezowski, 16 Eastwood Trailer Ct., Lloydminster, Saskatchewan, Canada, S9V 0L4

[21] Appl. No.: 210,492

[22] Filed: Mar. 21, 1994

[51] Int. Cl.[6] .................. B23P 19/04

[52] U.S. Cl. .................. 29/227; 29/268

[58] Field of Search .................. 29/227, 268, 229; 254/10.5; 81/9.3, 302, 385, 418, 424.5, 426; 140/117, 118, 120, 121, 123, 123.5, 139, 140, 147, 149

[56] References Cited

U.S. PATENT DOCUMENTS

| | | | |
|---|---|---|---|
| 197,717 | 12/1877 | Caldwell | 81/9.3 |
| 316,566 | 4/1885 | Pierce | 81/9.3 |
| 596,864 | 1/1898 | Farrar | 140/118 |
| 779,221 | 5/1904 | Kennard | 140/121 |
| 1,122,165 | 12/1914 | Schoening | 81/302 |
| 1,951,953 | 3/1934 | Tollonitsch | 29/268 |
| 2,673,392 | 3/1954 | McFadden . | |
| 3,033,244 | 5/1962 | Patterson | 140/118 |
| 4,001,927 | 1/1977 | Enderle . | |
| 5,140,734 | 8/1992 | Taggart . | |
| 5,237,729 | 8/1993 | Martin . | |

*Primary Examiner*—Robert C. Watson
*Attorney, Agent, or Firm*—Murray E. Thrift; Adrian D. Battison; Stanley G. Ade

[57] ABSTRACT

Air brake anchor spring pliers have two straight plier arms arranged side by side and linked by an adjustable pivot mechanism. At the jaw ends of the arms are two convergent slots that slope towards one side of the pliers. These are arranged to engage air brake anchor springs of all types. The opposite, handle ends of the pliers slope outwardly and have bevelled ends that may be used to pry the spring ends loose from the brake shoes.

5 Claims, 3 Drawing Sheets

AIR BRAKE ANCHOR SPRING PLIERS

FIELD OF THE INVENTION

The present invention relates to an air brake anchor spring tool and more particularly to pliers for installing such a spring.

BACKGROUND

The installation of air brake anchor springs on cam type vehicle air brakes is often difficult. The springs are usually gripped and stretched for installation using locking pliers or some other type of gripping tool. This can damage the springs and may be dangerous if the gripping tool slips off the end of the spring. This technique requires a considerable effort on the part of the installer for stretching the spring.

The present invention relates to a tool that may be used for the convenient handling of such springs.

SUMMARY

According to the present invention there is provided air brake anchor spring pliers comprising:

two plier arms;

pivot lug means projecting from each arm;

pivot pin means joining the pivot lug means at a position between the two plier arms for relative pivotal movement of the arms about a plier axis;

spring engaging means on the plier arms at a jaw end of each arm, the spring engaging means comprising a slot extending into the end of each plier arm and arranged with the slots in the two arms converging towards one side of the pliers.

The pivot pin is preferably adjustable on the lugs to accommodate the anchor springs of different types of brakes. It is also preferred that the handle ends of the arms slope outwardly and are bevelled at the ends so that they can be used for spring removal.

BRIEF DESCRIPTION OF THE DRAWINGS

In the accompanying drawings, which illustrate an exemplary embodiment of the present invention.

DETAILED DESCRIPTION

Figure 1:
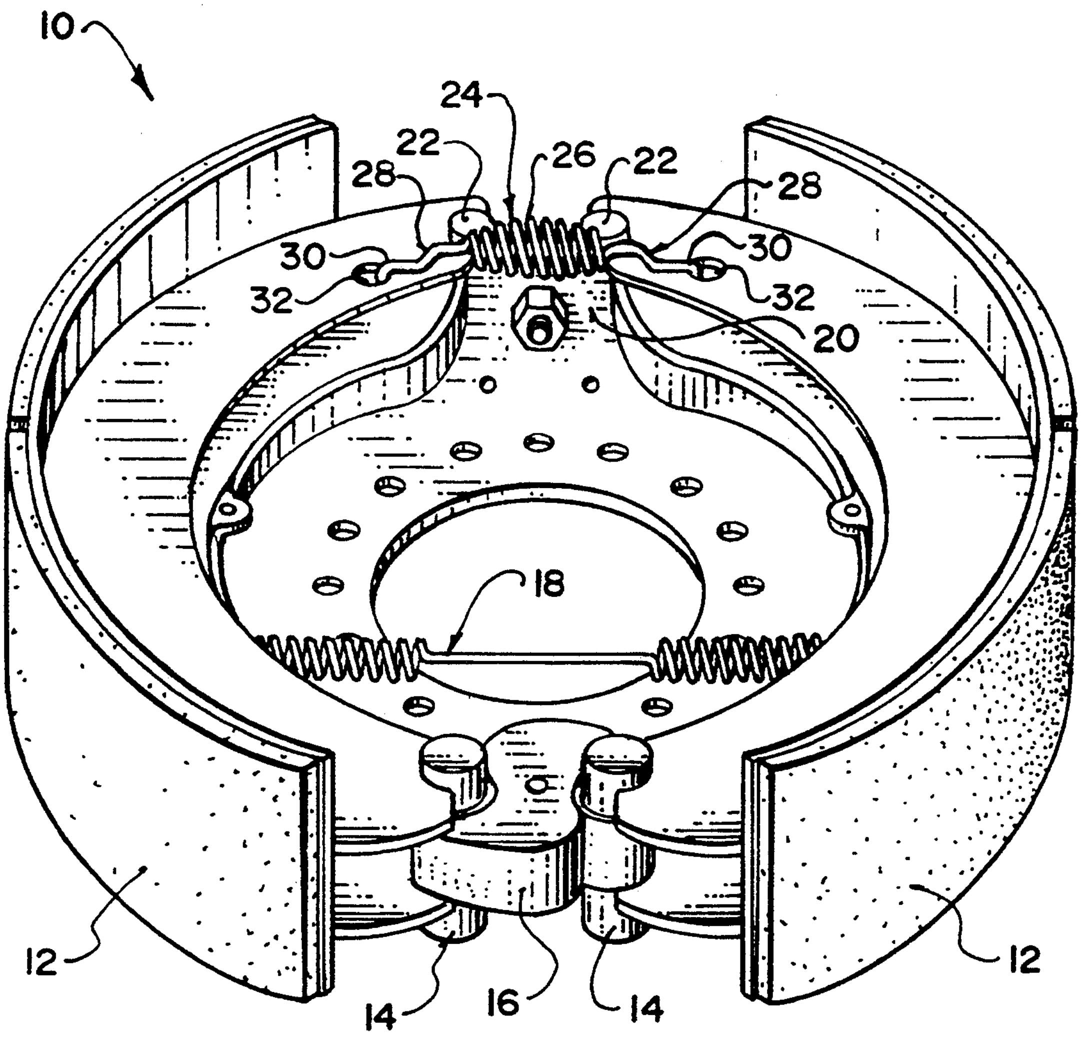
FIG. 1 is an isometric view of a brake.

Referring to the accompanying drawings, FIG. 1 illustrates a conventional brake 10 with two brake shoes 12. Each shoe has a cam roller 14 at one end. A cam 16 is engaged between the two rollers. When rotated, the cam moves the two rollers outwards to actuate the brake. A cam return spring 18 joins the shoes to draw them together adjacent the cam 16.

The opposite ends of the brake shoes are supported on an anchor 20 by anchor pins 22. The pins are the fulcrum points for the pivotal movements of the brake shoes. In the illustrated brake shoe, two pins are used. In the brakes of other manufacturers, a single anchor pivot may be used.

To hold the shoes on the pins 22, the shoes are linked by two anchor springs 24 (one shown). Each anchor spring includes a center coil 26 and two coupling ends 28 terminating in hooks 30. Each hook 30 engages in a hole 32 in the brake shoe. The anchor spring that is not illustrated is symmetrically arranged on the opposite side of the brake.

The anchor springs 24 are difficult to install and remove. To handle these springs, the present invention proposes a set of pliers 34 illustrated in FIGS. 2 through 7. The pliers include two arms 36 and 38 with respective jaw ends 40 and 42 and respective handles 44 and 46 at ends opposite the jaw ends. Each arm is a linear rod.

Projecting from the side of arm 36 towards arm 38 is a pivot lug 48. This has two through pivot holes 50 and 52. Two parallel pivot lugs 54 project from the side of arm 38 on opposite sides of the lug 48. The lugs 54 have aligned pivot holes 56 that will line up with either of the pivot holes 50 and 52. A pivot pin 58, in the form of a bolt and nut combination links the lugs 54 to the lug 48.

Figure 6:
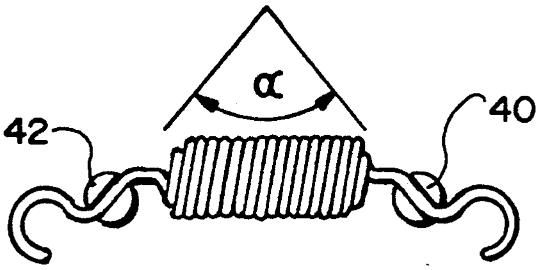
FIG. 6 is an end view of the tool engaged with one type of anchor spring.

At the jaw ends of the two arms 36 and 38, the arms have respective diametrical slots 60 and 62 extending into the ends of the arms. These slots converge towards one side of the pliers at an included angle $\alpha$ of 100° (FIG. 6).

At the opposite end of each arm, the end face is bevelled at an angle $\beta$ (FIG. 4) of 70° from a plane perpendicular to the handle axis.

Figure 7:
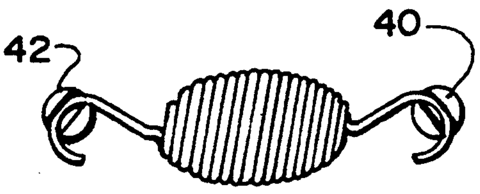
FIG. 7 is an end view of the tool engaged with another type of anchor spring.
Figure 2:
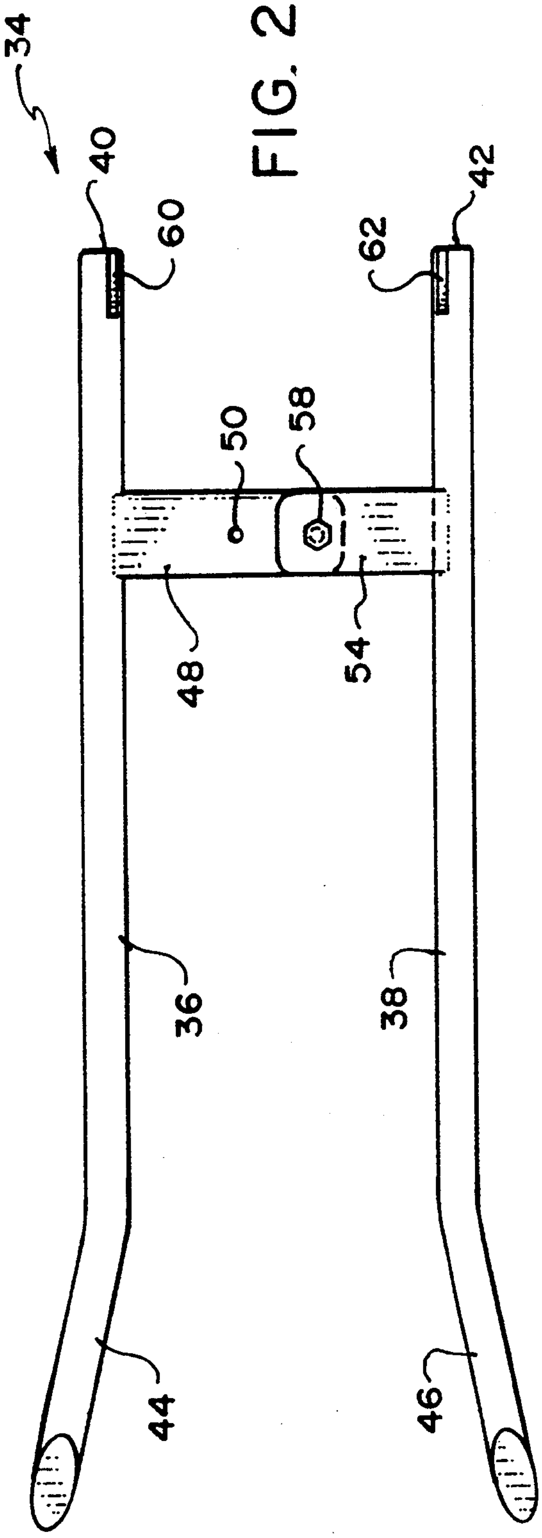
FIGS. 2 and 3 are plan views of a tool according to the present invention.
Figure 3:
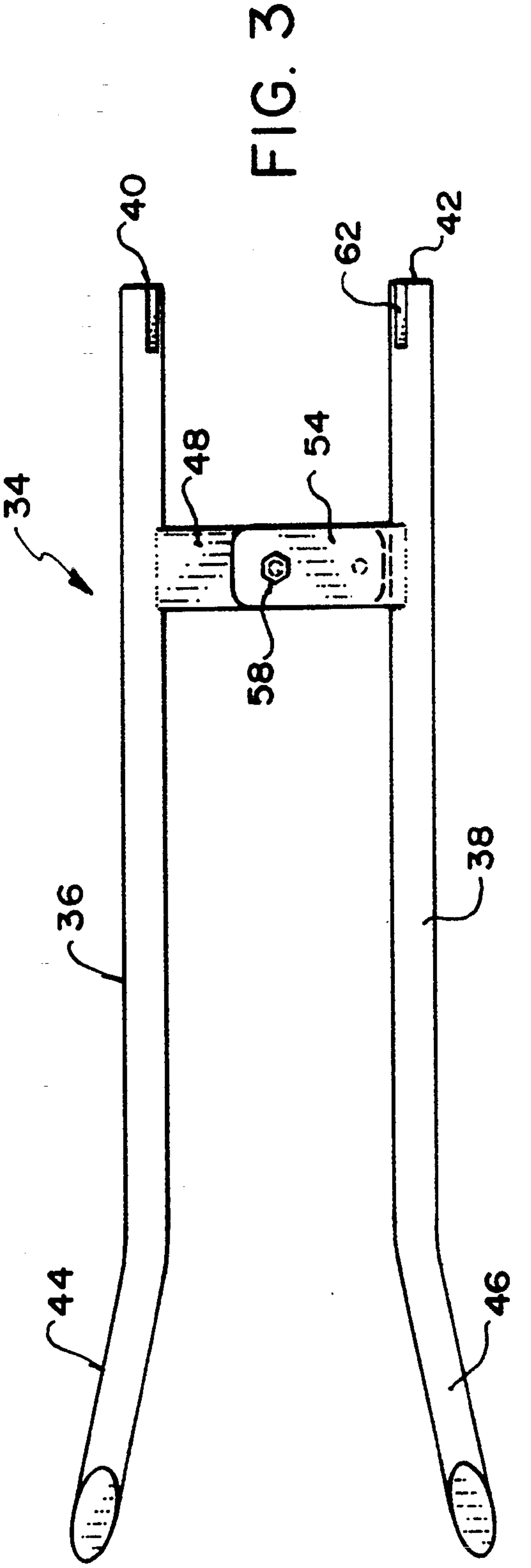
Figure 4:
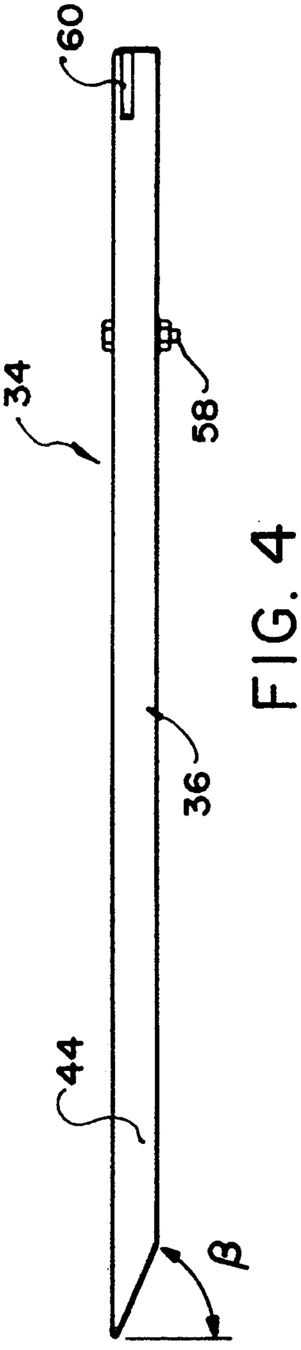
FIG. 4 is a side view of the tool.
Figure 5:
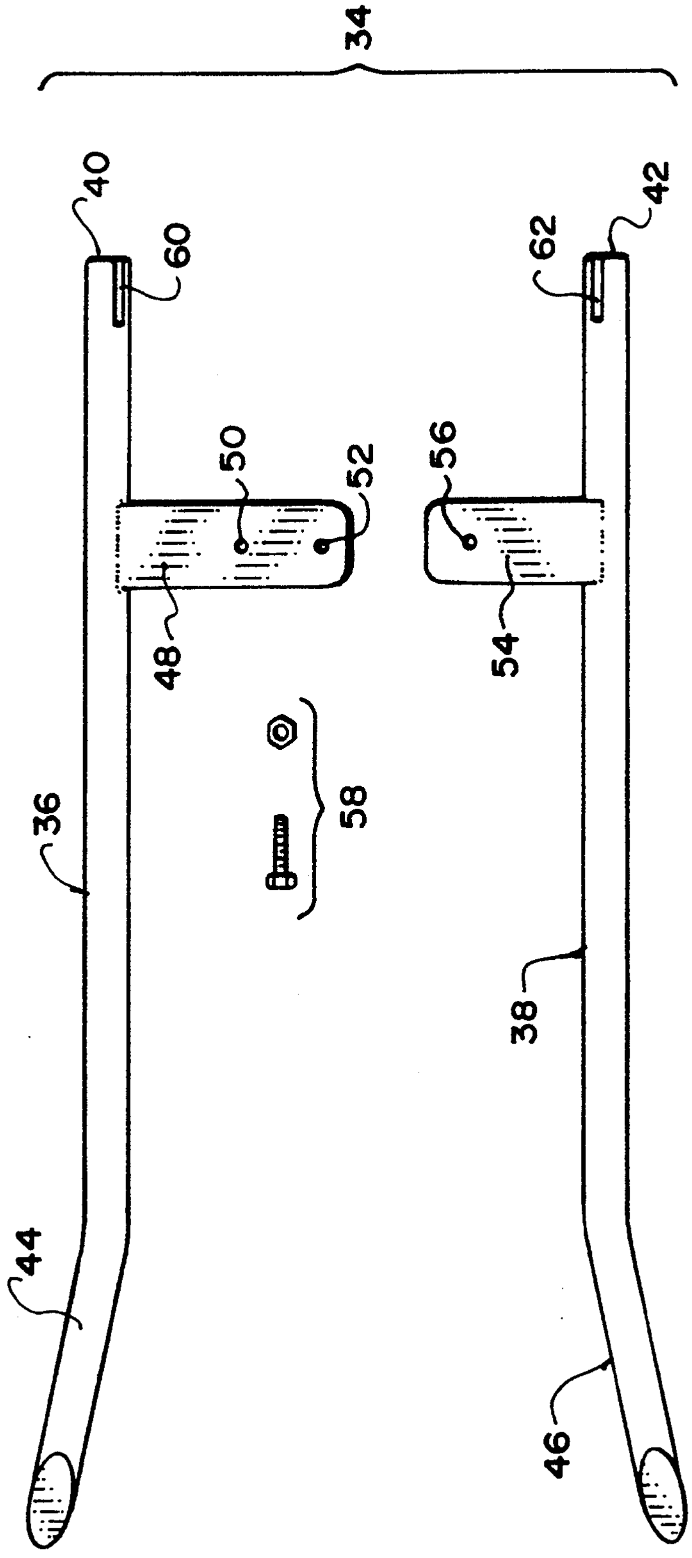
FIG. 5 is an exploded plan view of the tool.

In use of the tool, the pivot pin 58 is installed through the pivot holes 56 and one of the holes 50 or 52, depending on the particular brake being handled at the time. With Fruehalf or Rockwell air brakes, the inner hole 50 will be used as shown in FIG. 3, while with Eaton brakes, the outer hole will be used as shown in FIG. 2. The slots are oriented to engage the bend in the end pieces of the spring with a Fruehalf or Rockwell type anchor spring as illustrated in FIGS. 1 and 6, or the hooks of the springs with Eaton type anchor springs as illustrated in FIG. 7. With the pliers so engaged, pushing the handles together will stretch the spring so that it can be installed. For removal, the bevelled end of the handle may be engaged under the hook of the spring and the hook simply pried out of the mounting hole.

The revised installation procedure for installing the anchor brakes is as follows:

1. Install the rollers and roller retainers.
2. Install the cam return spring pins (not shown).
3. Set the upper shoe on the cam and the anchor pin.
4. Hang the return spring from the upper shoe return spring pin.
5. Pull the lower shoe out of position.
6. Hook the cam return spring on the lower pin.
7. Install the roller end of the lower shoe on the cam and push the anchor end down and in, onto the anchor pin.
8. Install the spring in the pliers.
9. Insert one end of the spring in the proper hole of the shoe.
10. Stretch the spring with the pliers and install the other end.

This procedure is extremely simple and makes the installation of the anchor springs much simpler than has heretofore been the case.

While one embodiment of the pliers has been described in the foregoing, it is to be understood that other embodiments are possible within the scope of the invention. The invention is to be considered limited solely by the scope of the appended claims.

I claim:

1. Air brake anchor spring pliers comprising:

two plier arms;

pivot lug means projecting from each arm;

pivot pin means joining the pivot lug means at a position between the two plier arms for relative pivotal movement of the arms about a plier axis;

spring engaging means on the plier arms at a jaw end of each arm, the spring engaging means comprising a slot extending into the end of each plier arm and arranged with the slots in the two arms converging towards the center of the pliers at one side of the pliers.

2. Pliers according to claim 1 wherein the pivot pin means are adjustable along at least one of the lug means so as to vary the spacing of the two plier arms.

3. Pliers according to claim 1 wherein the ends of the arms opposite the jaw ends include handle portions that slope outwardly away from one another.

4. Pliers according to claim 3 wherein the end of each handle portion is bevelled at an angle of 70°.

5. Pliers according to claim 1 wherein the slots converge at an included angle of 100°.

* * * * *